United States Patent [19]
Takeuchi

[11] 3,840,812
[45] Oct. 8, 1974

[54] MODULATOR ARRANGEMENT FOR CATV SYSTEMS

[75] Inventor: Takeshi Takeuchi, Yokohama, Japan

[73] Assignee: Hochiki Corporation, Tokyo, Japan

[22] Filed: Mar. 26, 1973

[21] Appl. No.: 344,983

[30] Foreign Application Priority Data

Apr. 1, 1972 Japan .............................. 47-37845

[52] U.S. Cl............ 325/308, 325/364, 178/DIG. 13
[51] Int. Cl. ........................................... H04b 1/06
[58] Field of Search ............. 325/308, 309, 364, 67; 333/70 T; 178/DIG. 13; 179/170 C; 340/150, 151, 310

[56] References Cited

UNITED STATES PATENTS

| | | | |
|---|---|---|---|
| 1,495,992 | 6/1924 | Espenschied | 179/170 C |
| 1,735,044 | 11/1929 | Green | 179/170 C |
| 3,105,873 | 10/1963 | Winston et al. | 178/DIG. 13 |
| 3,255,306 | 6/1966 | Campbell et al. | 178/DIG. 13 |
| 3,761,914 | 9/1973 | Hardy et al. | 178/DIG. 13 |

*Primary Examiner*—Albert J. Mayer
*Attorney, Agent, or Firm*—Frank J. Jordan

[57] ABSTRACT

A modulator capable of distinguishing up-signals from one another and used in a bi-directional CATV system intended for various kinds of information services includes an arrangement wherein output terminal of a modulating portion is connected to a down-signal input terminal via a filter circuit for letting an up-signal frequency band or predetermined frequencies transmitted from the modulating portion and within the up-signal frequency band pass therethrough. The input terminal of the modulating portion is connected to a down-signal output terminal via a filter circuit for letting signals having frequencies transmitted from suscriber's alarm transmitters a filter circuit is connected between down-signal input and output terminals for letting down-signals pass therethrough.

9 Claims, 9 Drawing Figures

MODULATOR ARRANGEMENT FOR CATV SYSTEMS

The present invention relates to a modulator used for distinguishing a plurality of up-signals from one another in a bi-directional community antenna television system or CATV system. The modulator according to the present invention can be used in a CATV system wherein it is located at an optional place to receive an alarm signal sent from a suscriber's terminal and to modulate it to be transmitted to the head end. The development of CATV system, especially the employment of bi-directional CATV system has made it possible to provide two-way services to subscribers, that is, sending bright images to televisions of subscribers, on the one hand, and receiving up-signals for prevention of crimes and disasters from subscribers, on the other hand. However, it will become important what system of bi-directional CATV should be employed and how the up-signals for prevention of crimes and disasters should be discriminated from one another to learn who among the subscribers have sent them. A system which can easily come into consideration is one using a plurality of cables, but this system has the drawback of being too expensive. In a bi-directional CATV system which is generally and conventionally employed and in which the frequency band is divided for the up-signals and the downsignals respectively, it becomes important how the plural up-signals should be discriminated from one another. The cost of the system and the number of subscribers depend on how many signals can be sent through the up-signal frequency bands.

Accordingly, the object of the present invention is to allow as many subscribers as possible to send signals through the up-signal frequency bands, and to provide a modulator capable of distinguishing plural up-signals from one another.

Figure 1:
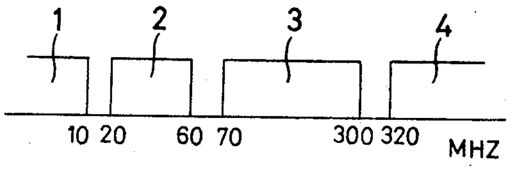
FIG. 1 shows frequency bands used in the bi-directional CATV system.

Detailed embodiments of the present invention will now be described by referring to the drawings.

In FIG. 1 reference numeral 2 denotes an up-signal frequency band of 20 to 60 MHz, and reference numeral 3 a down-single frequency band of 70 to 300 MHz. These frequency bands are examples used in a general bidirectional CATV system. Reference numeral 1 shows a frequency band at the lower side of the frequency band 2 and lower than 10MHz, and reference numeral 4 a frequency band at the higher side of the frequency band 3 and higher than 320 MHz. The present invention is intended to use these frequency bands 1 and 4, too, for alarming purposes.

Figures 2, 3:
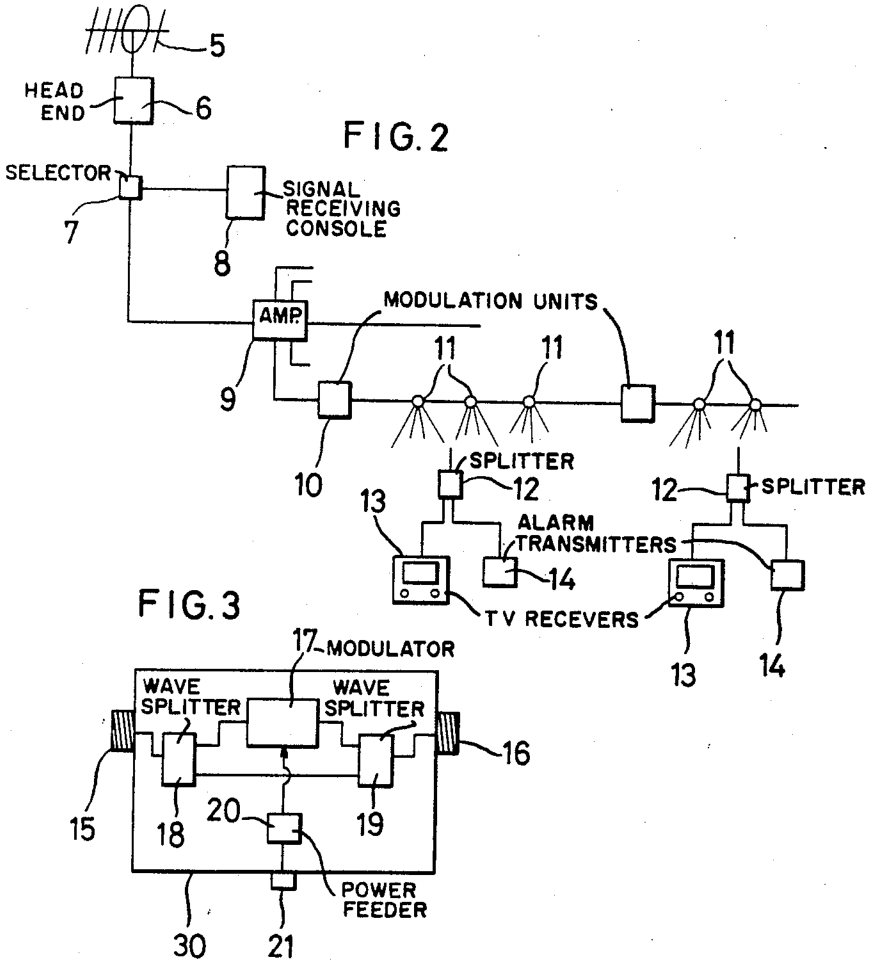
FIG. 2 is a block diagram of the bi-directional CATV in which a modulation unit according to the present invention is used.
FIG. 3 is a schematic diagram of the unit.

The bi-directional CATV system provided with the modulation unit of the present invention will now be described with reference to FIG. 2. In FIG. 2 reference numeral 5 represents an antenna for receiving electric waves in the air, 6 a head end for controlling and transmitting these electric waves and the down-signals which may be program signals, 7 a selector for selecting signals transmitted from a modulation unit 10, 8 a signal receiving console for receiving the selected signals. For example, the console may be a supervisory station having means for receiving and decoding, which means may be a conventional one used to the end. 9 is a bi-directional amplifier, 11 a tap-off for bridging signals, 12 a signal splitter, 13 a television receiver and 14 a subscriber alarm transmitter.

Each of the subscriber alarm transmitters 14 has its own fixed frequency whose band is, for example, low or audio frequency band ranging from several Hz to several ten thousand Hz, and the fixed frequency of each of the subscriber alarm transmitters 14 has a certain interval disposed therebetween. Needless to say, there is no need to limit the frequencies of the transmitters 14 to the audio frequency band, but the ultra-high frequency band 4 may be sometimes used therefor.

The modulation unit 10 is intended for the carrier waves within a high frequency band, for example, of 20 to 60 MHz. Each of the units 10 has its own fixed frequency, and a certain interval of, say, 0.2 MHz is provided between each of the fixed frequencies of the unit.

When a particular alarm transmitter 14 is operated in the CATV system as described above, its own fixed low frequency is generated to oscillate and modulate the fixed frequency (or high frequency) of the modulation unit 10 which the transmitter 14 belongs and this modulated up-signal is transmitted to the signal receiving console 8. According to the combination of two frequencies of the carrier wave and the modulating wave the signal receiving console 8 detects which unit 10, and accordingly, which alarm transmitter 14 belonging to the modulation unit 10 has been operated and displays it.

As shown in FIG. 3, the modulation unit 10 comprises a terminal 15 which is attached to a case 30, a terminal 16, a modulator 17, wave splitters 18, 19, an electric power feeder 20, and a power terminal 21 or the like. The electric circuit of the modulation unit 10 is as shown in FIGS. 4 to 6 in which the transmitting frequencies of the alarm transmitter 14 are those within the bands 1 and 4 (see FIG. 1).

Figure 4:
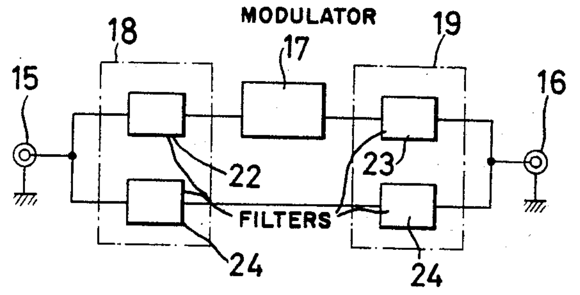
FIGS. 4 through 9 are block diagrams showing various embodiments of the unit.

In FIG. 4 the wave splitters 18 and 19 comprise filter circuits 22, 24 and filter circuits 23, 24, which may be of an L-C type or of a mechanical type such as a ceramic filter in which the filter circuit 22 allows the whole of the frequency band 2 to pass, the filter circuit 23 permits the bands 1 and 4 as shown in FIG. 1 to pass, and the filter circuit 24 allows the whole of the frequency band 3 to pass.

The operation of the modulation unit as shown in FIG. 4 is as follows : the down-signals, which may be program signals, transmitted through the terminal 15 is directed through the filter circuit 24 to the terminal 16. The signal which is transmitted from the transmitter 14 and which is within the bands 1 and 4, comes from the output terminal 16 into the filter circuit 23 to modulate the carrier wave within the frequency band 2 which is transmitted from the modulator 17 and is directed, as the modulated up-signal, through the filter circuit 22 to the input terminal 15. In this case all of the alarm signals transmitted from subscriber terminals pass through the modulator 17 and cascade connection of these units can not be effected.

Figure 5:
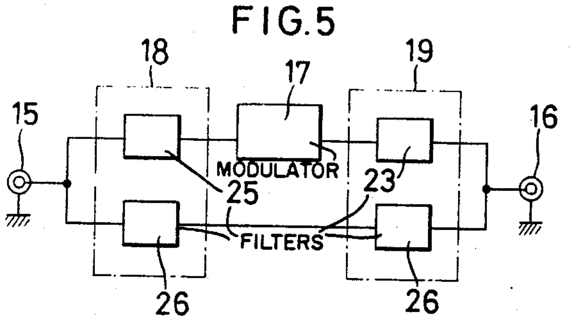
Figure 6:
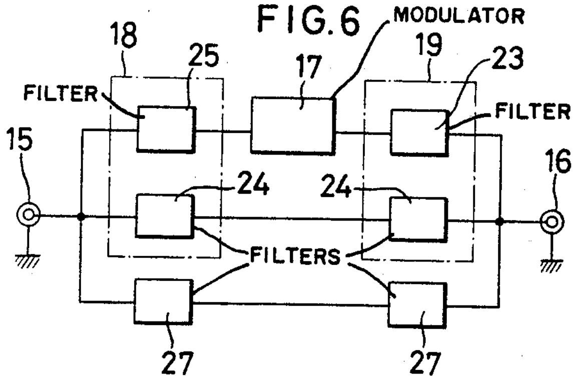

FIGS. 5 and 6 show circuits permitting the cascade connection to be effected. in FIG. 5 a filter circuit 25 of the wave splitter 18 between the terminal 15 and the modulator 17 allows only a particular frequency which is differenciated for the individual units to pass therethrough, and the other filter circuit 26 of the wave splitter 18 also allows signals having frequencies except the particular one just concerned and passing through filter 25. This means that, up-signals having different frequencies transmitted from a different modulator connected at the subsequent stage can pass through the filter circuit 26 concerned. The filter circuit 23 of the wave splitter 19 between the modulator 17 and the terminal 16 is the same as the filter circuit 23 in FIG. 4 and the filter circuit 26 of the wave splitter 19 is the same as the filter circuit 26 of the wave splitter 18. The modulation unit as shown in FIG. 5 enables the cascade connection between groups thereof since signals from the other units subsequet to the terminal 16 pass through the filter circuit 26 when they come up. FIG. 6 shows another filter circuits 27 connected to the terminals 15, 16 said filter circuits 27 having such a feature of letting up-signals from the other units pass therethrough, thus enabling the cascade connection to be attained similarly as in FIG. 5.

The difference between the circuit as shown in FIG. 4 and the one as shown in FIG. 5 is as follows: it goes without saying that the number of alarm transmitters to which such a modulation unit can treat is not limitless. Therefore, in case of the circuit as shown in FIG. 4, when a modulation unit is once attached to a distribution line, the number of subscriber terminals which can be connected to the line should be limited within the capacity of the modulation unit. Accordingly, when the number of subscribers increases later to exceed such capacity, it will be necessary to add to the CATV system itself such changes as to increase the number of distribution lines, to replace splitters of two-way distribution type by those of, for example, three-way distribution type, or the like, thus increasing the cost of construction with some difficulties added. On the other hand, in case of the circuit as shown in FIG. 5, when one modulation unit cannot meet the number of subscribers, all that is necessary is to to cascade-connect plural modulation units. This is very convenient. Further, when the existing modulation units in a completed CATV system cannot meet the number of later increasing subscribers, it is also possible to overcome the problem by cascade-connecting another modulation thereto.

Figure 7:
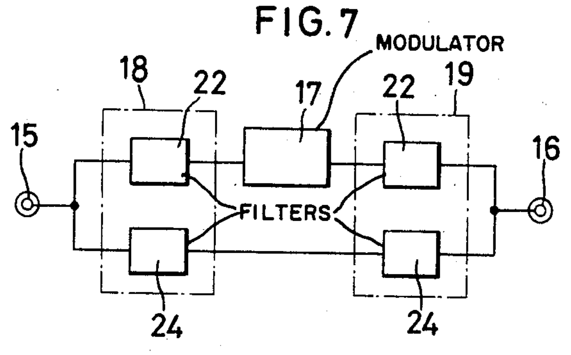
Figure 8:
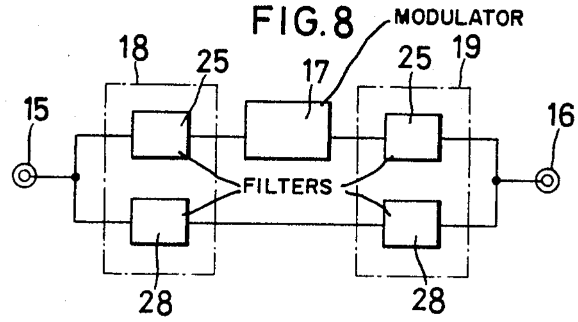
Figure 9:
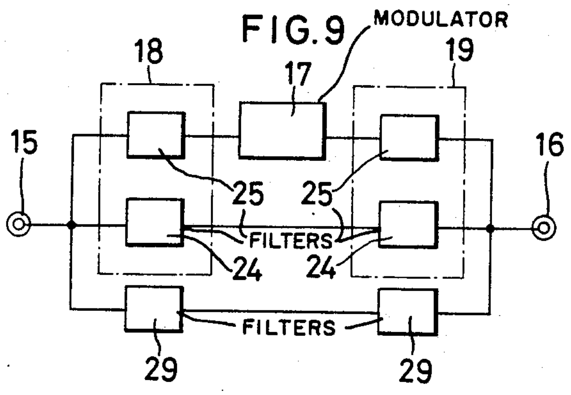

However, it is a little difficult from the engineering aspect to let the filter circuits 26 as shown in FIG. 5 have such a desired feature. It is the circuit as shown in FIG. 6 that has overcome this difficulty, wherein two filter circuit 24 and 27 perform the function of the filter circuit 26 as shown in FIG. 5. In the modulation unit as shown in FIG. 6 the modulator 17, the wave splitter 18 and the filter circuit 27 are peculiar to the unit itself, but filter circuits 23 and 24, namely, the wave splitter 19 is common to all of the other units; while in the unit as shown in FIG. 5 the modulator 17 and the wave splitters 18 and 19 are peculiar to itself. Accordingly, as compared with the unit of FIG. 5, the one of FIG. 6 has more common parts, thus being more suitable for easy repair work and cost reduction In the case where the frequency bans 2 shown in FIG. 1 is used as that for those signals transmitted from the subscriber alarm transmitters 14, the modulation unit 10 has such constructions as shown in FIGS. 7 to 9. These are the same as those as shown in FIGS. 4 to 6 in that each of them includes a terminal 15, an terminal 16, a modulator 17 and wave splitters 18, 19. But the unit in FIG.7 has a filter circuit 22 provided in place of the filter circuit 23 in FIG. 4, said filter circuit 22 having such a feature as allows the whole of the frequency band 2 to pass therethrough. The function of the unit in FIG. 7 is the same as that of the unit in FIG. 4. The modulator in FIG. 8 crresponds to that in FIG. 5, but the filter circuit 23 of the wave splitter 19 in FIG. 5 is replaced by a filter circuit 25' having such a feature as allows only particular frequencies within the up-signal frequency band 2 and transmitted from the subscriber alarm transmitter 14 to pass therethrough, and there is used, as the side passage filter, a filter circuit 28 which is featured by letting the other up-signals having frequencies except those transmitted from the modulator 17 itself as well as the down-signals pass through FIG. 9 corresponds to FIG. 6, but in place of the filter circuit 23 of the wave splitter 19 in FIG. 6 is used the filter circuit 25' and in place of the side passage filter circuit 27 a filter circuit 29, which is characterized by letting the other up-signals having frequencies except those transmitted from the modulator 17 itself pass therethrough.

As above-described in detail, the present invention employs, as frequency bands for signals transmitted from subscriber alarm transmitters, the frequency bands 1 and 4 as well as 2 shown in FIG. 1 and transmits the modulated up signal after modulating the carrier wave having the frequency within the frequency band 2 shown in FIG. 1 and transmitted from the modulation unit attached to an optional place on the same cable line by means of the alarm signal within either of these bands except the down-signal frequency band 3, thus enabling same members used in geneal CATV systems to be utilized as those used between the modulation unit and the head end in the CATV system in which the unit of the present invention is used and also enabling such greater number of signals to be gained by adequately combining frequencies transmitted from subscriber alarm transmitters and carrier wave frequencies of the unit. Further, the modulation unit of the present invention has such an advantage that it gives no trouble to the usual transmission of images.

What merits can be provided by using the frequency band 2 in FIG. 1 as for frequencies transmitted from transmitters ? It is the possibility of fully using the frequency bands which can be utilized in the CATV system. Namely, by using the frequency band 2 in addition to the bands 1 and 4 in FIG. 1 are modulated carrier waves of the modulator which use the same frequency band, and various kinds of combinations of signals are available by changing the combination between frequencies transmitted from transmitters and carrier wave frequencies of the modulator. The mirit resulted from using the frequency bands 1 and 4 as for frequencies transmitted from transmitters is that the frequency bands 1 and 4 in FIG. 1, that is, those bands which are not used in the usual CATV systems can be utilized, as for frequencies transmited from subscriber transmitters, to the point of the modulation unit, thus enabling much more signals to be obtained from subscribers by combining this merit with the modulator which uses the frequency band 2 shown in FIG. 1. As one of the tap-offs 11 used in the system can be mentioned a tap-off of bi-directional type in which the ratio of connecting down-signals to subscriber terminals over same range of frequencies is equal to that of connecting signals transmitted from subscriber terminals to the distribution line.

In the case where frequencies within the frequency bands 1 and 4 are used as those transmitted from transmitters are used bi-directional tap-offs provided with bridging circuits in which the ratio of connecting down-signals to subscriber terminals is kept suitable for the down-signal frequency band while the connection from subscriber terminals to the distribution line is kept within the frequency bands suitable for frequencies transmitted from subscriber terminals.

What is claimed is:

1. An arrangement in a CATV system comprising, in combination, a coaxial transmission line connecting said system to a plurality of subscribers; a transmitter at each subscriber and transmitting through said line an alarm signal identifying the respective subscriber, a supervisory station for receiving said alarm signal; a pair of terminals in said line and connected to a first and a second path therebetween, filter means in said first path and passing only down-signals therethrough, modulator means in said second path for generating a carrier wave of predetermined frequency outside the range of frequencies of said down-signals and modulating said carrier wave with said alarm signal transmitted from the respective subscriber transmitter to transmit thereby the modulated up-signal to said supervisory station through said line, and a pair of wave filters in said second path, said modulator means being between said wave filters, one of said wave filters being in proximity to the subscriber transmitter and passing only said alarm signal from the subscriber transmitter, the other one of said wave filters being in the proximity of said supervisory station and passing only the modulated up-signal from said modulator means.

2. The arrangement as defined in claim 1 wherein said filter means in said first path comprises a first filter in said one wave filter and a second filter in said other wave filter, said first and second filters being substantially identical.

3. The arrangement as defined in claim 2 including a third path between said terminals and having auxiliary filter means for passing up-signals therethrough from the other subscribers.

4. An arrangement in a CATV system as claimed in claim 1 including a pair of wave splitters (18) and (19) each comprising a filter circuit (22) allowing the whole of an up-signal frequency band (2) to pass therethrough, a filter circuit (23) through which bands except up-and down-signal frequency bands can pass, and filter circuits (24) permitting the whole of a down-signal frequency band (3) to pass therethrough.

5. An arrangement in a CATV system as claimed in claim 1 including a first wave splitter (18) which comprises a filter circuit (25) for letting only particular frequencies within the upsignal frequency band and transmitted from the modulating means (17) to pass therethrough, and a filter circuit (26) for letting up-signals pass therethrough, said up-signals having frequencies except those particular ones within the down-signal frequency band (3) and within the up-signal frequency band and transmitted from the modulating means (17) itself, and further including a second wave splitter (19) comprising a filter circuit (23) for letting bands except the up-and down-signal frequency bands pass therethrough, and a filter circuit which is the same as the filter circuit (26) of said first wave splitter (18).

6. An arrangement in a CATV system as claimed in claim 4 further comprising filter circuits (27) different from those of said pair of wave splitters (18) and (19), said latter filter circuits (27) letting pass up-signals having frequencies except those transmitted from said modulating means (17).

7. An arrangement in a CATV system as claimed in claim 1 including a pair of wave splitters (18, 19) each comprising a filter circuit (22) each allowing the whole of an up-signal frequency band (2) to pass therethrough, and filter circuits permitting the whole of a down-frequency band (3) to pass therethrough.

8. An arrangement in a CATV system as claimed in claim 1 comprising a wave splitter (19) which includes a filter circuit (25') letting only particular frequencies within the upsignal frequency band and transmitted from said subscriber alarm transmitters, and filter circuits (28) for letting up-signals having frequencies except those transmitted from the modulation means (17) and the whole of the down frequency band to pass therethrough.

9. An arrangement in a CATV system as claimed in claim 1 including a wave splitter (19) which includes a filter circuit (25') through which only particular frequencies transmitted from said subscriber alarm transmitters (14) and within the up-signal frequency band can pass, and a filtering circuit (29) for letting up signals having frequencies except those transmitted from said modulating means (17).

* * * * *